United States Patent
Kalyanaraman et al.

(10) Patent No.: US 8,479,129 B1
(45) Date of Patent: Jul. 2, 2013

(54) DYNAMIC TIME DOMAIN RANDOMIZATION TECHNIQUES FOR SOC AND IP VERIFICATION

(75) Inventors: Ravishankar Kalyanaraman, San Francisco, CA (US); Kumaril Bhatt, Cupertino, CA (US); Nikhil Mungre, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 68 days.

(21) Appl. No.: 13/110,508

(22) Filed: May 18, 2011

Related U.S. Application Data

(60) Provisional application No. 61/347,131, filed on May 21, 2010.

(51) Int. Cl.
*G06F 17/50* (2006.01)

(52) U.S. Cl.
USPC ............... 716/106; 716/100; 716/108

(58) Field of Classification Search
USPC ............ 716/106, 108, 132–138, 100; 703/13, 703/19; 710/100, 105, 107, 110, 116, 118, 710/123, 125
See application file for complete search history.

(56) References Cited

U.S. PATENT DOCUMENTS

| | | | |
|---|---|---|---|
| 6,678,625 B1 * | 1/2004 | Reise et al. ................... 702/117 |
| 6,757,882 B2 * | 6/2004 | Chen et al. .................... 716/102 |
| 7,051,315 B2 * | 5/2006 | Artzi et al. .................... 717/103 |
| 7,401,315 B2 * | 7/2008 | Duan et al. .................... 716/138 |
| 7,505,887 B1 * | 3/2009 | Canaris et al. ................. 703/14 |
| 7,603,643 B2 * | 10/2009 | McCracken et al. .......... 716/100 |
| 7,788,625 B1 * | 8/2010 | Donlin et al. ................. 716/109 |
| 8,042,086 B2 * | 10/2011 | Tseng ........................... 716/136 |
| 2002/0082969 A1 * | 6/2002 | O'Keeffe et al. .............. 705/37 |
| 2002/0188910 A1 * | 12/2002 | Zizzo ............................. 716/1 |
| 2003/0009730 A1 * | 1/2003 | Chen et al. ..................... 716/5 |
| 2003/0145290 A1 * | 7/2003 | Devins et al. ................... 716/4 |
| 2003/0204388 A1 * | 10/2003 | Rodriguez et al. ............. 703/14 |
| 2004/0243334 A1 * | 12/2004 | Wrigley et al. .............. 702/108 |
| 2004/0243959 A1 * | 12/2004 | Takemura ...................... 716/7 |
| 2006/0123079 A1 * | 6/2006 | Sturniolo et al. ............ 709/203 |
| 2006/0123370 A1 * | 6/2006 | Vergara-Escobar ............ 716/6 |
| 2006/0190857 A1 * | 8/2006 | Likovich et al. ............... 716/4 |
| 2006/0230364 A1 * | 10/2006 | Zhivova et al. ................ 716/1 |
| 2007/0113215 A1 * | 5/2007 | Duan et al. ..................... 716/16 |
| 2007/0277130 A1 * | 11/2007 | Lavelle ........................... 716/4 |
| 2008/0040090 A1 * | 2/2008 | Lee ............................... 703/14 |
| 2008/0184184 A1 * | 7/2008 | McCracken et al. .......... 716/10 |
| 2009/0144675 A1 * | 6/2009 | Haufe et al. .................... 716/4 |
| 2009/0150136 A1 * | 6/2009 | Yang ............................. 703/13 |
| 2009/0172621 A1 * | 7/2009 | Sathe et al. ..................... 716/6 |
| 2011/0202894 A1 * | 8/2011 | Chang et al. ................ 716/108 |

* cited by examiner

Primary Examiner — Stacy Whitmore

(57) ABSTRACT

The present disclosure describes a memory block manager. In some aspects a request is transmitted to a model of an IP block at a randomized time and a response is received from the model of the IP block useful to characterize behavior of the IP block when fabricated. In other aspects a response to a request is transmitted to a model of an IP block at a randomized time and a communication is received from the model of the IP block useful to characterize behavior of the fabricated IP block when fabricated.

20 Claims, 7 Drawing Sheets

DYNAMIC TIME DOMAIN RANDOMIZATION TECHNIQUES FOR SOC AND IP VERIFICATION

RELATED APPLICATIONS

This application claims priority to U.S. Provisional Patent Application Ser. No. 61/347,131 filed May 21$^{st}$, 2010, the disclosure of which is incorporated by reference herein in its entirety.

BACKGROUND

The background description provided herein is for the purpose of generally presenting the context of the disclosure. Unless otherwise indicated herein, the approaches described in this section are not prior art to the claims in this application and are not admitted to be prior art by inclusion in this section.

Components of an electronic or computing system are often integrated into a System-on-Chip (SoC) as intellectual property (IP) blocks, decreasing the size, cost, and power requirements of the system while providing equivalent features or functionality. Fast time-to-market pressures of highly complex SOCs and the increasing need to integrate new product differentiating features between product generations have forced SOC developers to integrate increasing number of functional IP blocks into these SoCs resulting in increased design complexity, compressed design schedules, and constrained design resources. To handle these trends SOC developers use third party IP blocks and a standard common bus architecture to connect these IPs for SoC development and design. These IP blocks are designed for standard interfaces, thus providing ease of integration into the SoC design saving time and resources.

Verification of an SoC design containing these third party IP blocks, however, is typically difficult as knowledge of the internal micro-architecture of the third party IP blocks is limited. Any assumptions made in the IP design micro-architecture which results in a unique behavior on its interface cannot be adequately exercised through pre-Si simulations. These assumptions are typically triggered when real world applications are run that cause these interesting interconnect stress conditions. Real world applications cause unique loading conditions thereby resulting in complex interconnect handshake behavior signature between the IPs which exposes untested areas. These untested areas can cause incorrect behavior of either the IP blocks or the interconnect logic and it manifests as functional failures in the silicon SoC as system hangs, lock-ups, and/or degraded performance. Debugging and root-cause analysis of these issues during post-Si validation is extremely difficult and time consuming causing a lot of expenditure of resources and time.

SUMMARY

This summary is provided to introduce subject matter that is further described below in the Detailed Description and Drawings. Accordingly, this Summary should not be considered to describe essential features nor used to limit the scope of the claimed subject matter.

A method and system are described for transmitting a request to a model of an IP block at a randomized time subjecting the model to a complex loading condition and receiving a response from the model useful to characterize behavior of the IP block when fabricated and subjected to the complex loading condition.

Another method and system are described for transmitting a response to a model of an IP block at a randomized time subjecting the model to a complex loading condition that is useful to characterize behavior of the IP block when fabricated and subjected to the complex loading condition.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different instances in the description and the figures indicate similar or identical items.

DETAILED DESCRIPTION

Conventional techniques for pre-silicon simulation are often simplistic, cumbersome, and time intensive. Current bus functional models used for intellectual property (IP) block and System-on-Chip (Soc) pre-silicon validation have limited flexibility and simple timing variability for testing basic IP block interconnects. Complex loading conditions, such as real-world application loading cannot adequately be simulated using these simplistic bus functional models. Additionally, tests written for pre-silicon simulation with these bus functional models verify and exercise an IP block under a generic set of parameters limiting an area of functional space tested. IP block and interconnect design issues within these untested areas can manifest as functional failures such as system hangs, lock-ups, and/or degraded performance, which are then debugged and diagnosed during the post-silicon stages of development at significant costs. This disclosure describes systems and techniques of dynamic time-domain randomization for complex IP block loading that allow IP blocks to be tested under complex loading conditions increasing functional space tested during pre-silicon simulation.

The following discussion describes an operating environment, techniques that may be employed in the operating environment, and a test methodology in which components of the operating environment can be implemented. In the discussion below, reference is made to the operating environment by way of example only.

Operating Environment

Figure 1:
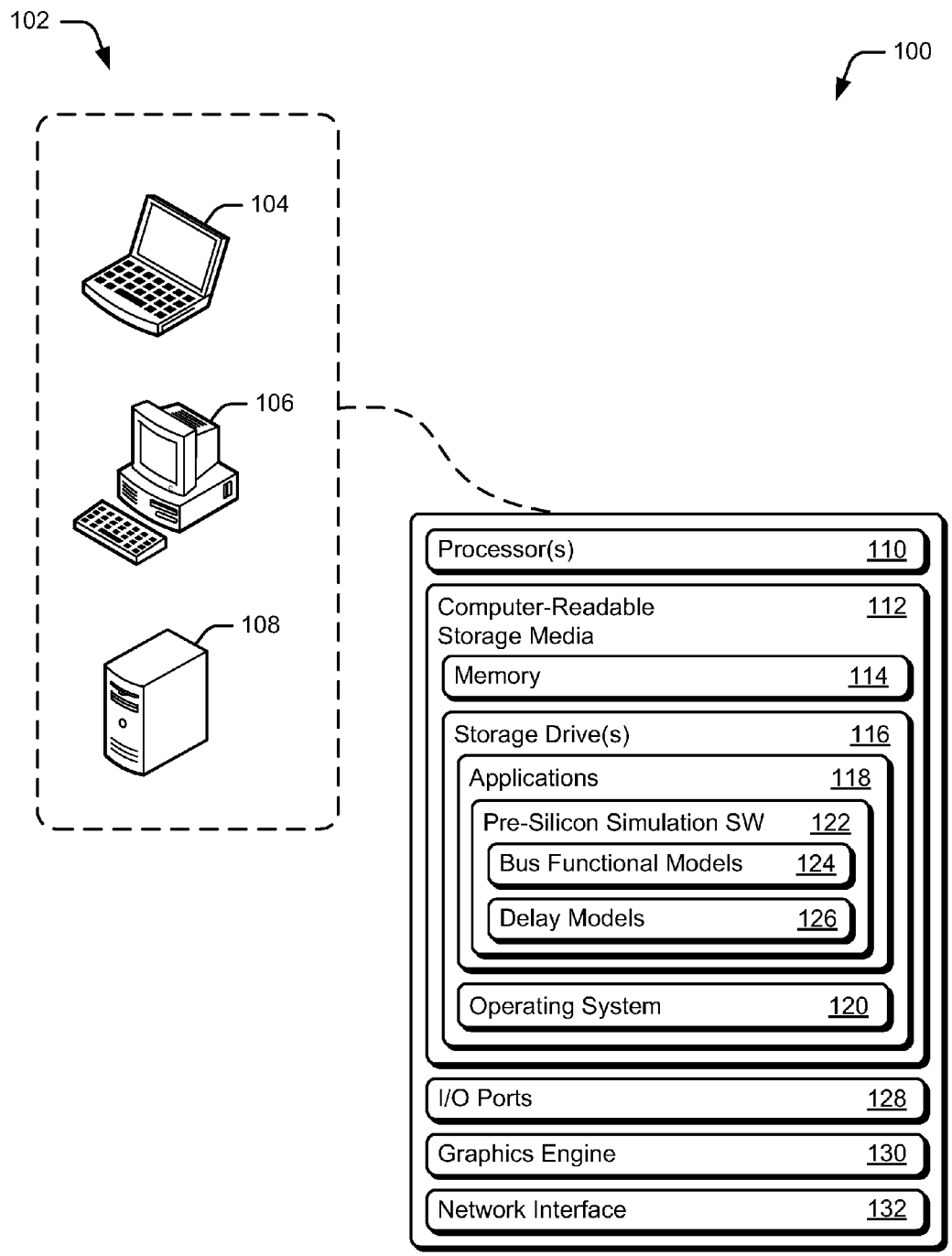
FIG. 1 illustrates an operating environment in which techniques of time randomization for complex IP block loading are implemented.

FIG. 1 illustrates an example of an operating environment 100 having simulation platforms 102, each of which are capable of performing pre-silicon simulations on models of electronic components and systems, such as IP blocks and System-on-Chips (SoCs). Simulation platforms 102 include laptop computer 104, desktop computer 106, and server 108. Simulation platforms 102 are capable of performing pre-silicon simulations by using a variety of hardware description languages (HDLs), such as Verilog, SystemVerilog, SystemC, and Very-High-Speed Integrated Circuit HDL (VHDL), to name a few.

Each simulation platform 102 includes processor(s) 110 and computer-readable storage media 112. Computer-readable storage media 112 may include any type and/or combination of suitable storage media, such as memory 114 and storage drive(s) 116. Memory 114 may include memory such as dynamic random-access memory (DRAM), read-only memory (ROM), or Flash memory (all not shown) useful to store data of applications 118 and an operating system 120 of the simulation platform 102.

Storage drive(s) 116 may include hard disk drives and/or solid-state drives (not shown) and are useful to store code or instructions associated with the applications 118 and the operating system 120 of the simulation platform 102. Processor(s) 110 can be any suitable type of processor, either single-core or multi-core, for executing instructions or commands of the operating system 120 or applications 118 stored on storage drive(s) 116.

Applications 118 includes pre-silicon simulation software (software) 122 for simulating models of various electronic components and systems, such as IP blocks, SoCs, application-specific integrated circuits (ASICs), very-large-scale-integration (VLSI) circuits, and the like. Software 122 may include bus functional models 124 and delay models 126. Components of bus functional models 124 and delay models 126 and how they are implemented and used varies and are described below.

Simulation platforms 102 also each include I/O ports 128, graphics engine 130, and network interface 132. I/O ports 128 allow a simulation platform 102 to interact with other devices and/or users. I/O ports 128 may include any combination of internal or external ports, such as audio inputs and outputs, USB ports, Serial ATA (SATA) ports, PCI-express based ports or card-slots, and/or other legacy ports. Various peripherals may be operatively coupled with I/O ports 128, such as human-input devices (HIDs), external computer-readable storage media, or other peripherals.

Graphics engine 130 processes and renders graphics for simulation platform 102, including user interface elements of an operating system, applications, simulation and test environments of software 122, and the like. Network interface 132 provides connectivity to one or more networks, which allows the simulation platform 102, or components thereof, to communicate via the network(s). For example, software 122 may receive updates for functional bus models 124 and/or delay models 126 from an IP block vendor's website or server via the internet. Additionally or alternately, simulation platform 102 may distribute or partition a process of software 122 across two or more other networked simulation platforms (e.g. dedicated simulation servers) to reduce an amount of time required to complete a simulation.

Figure 2:
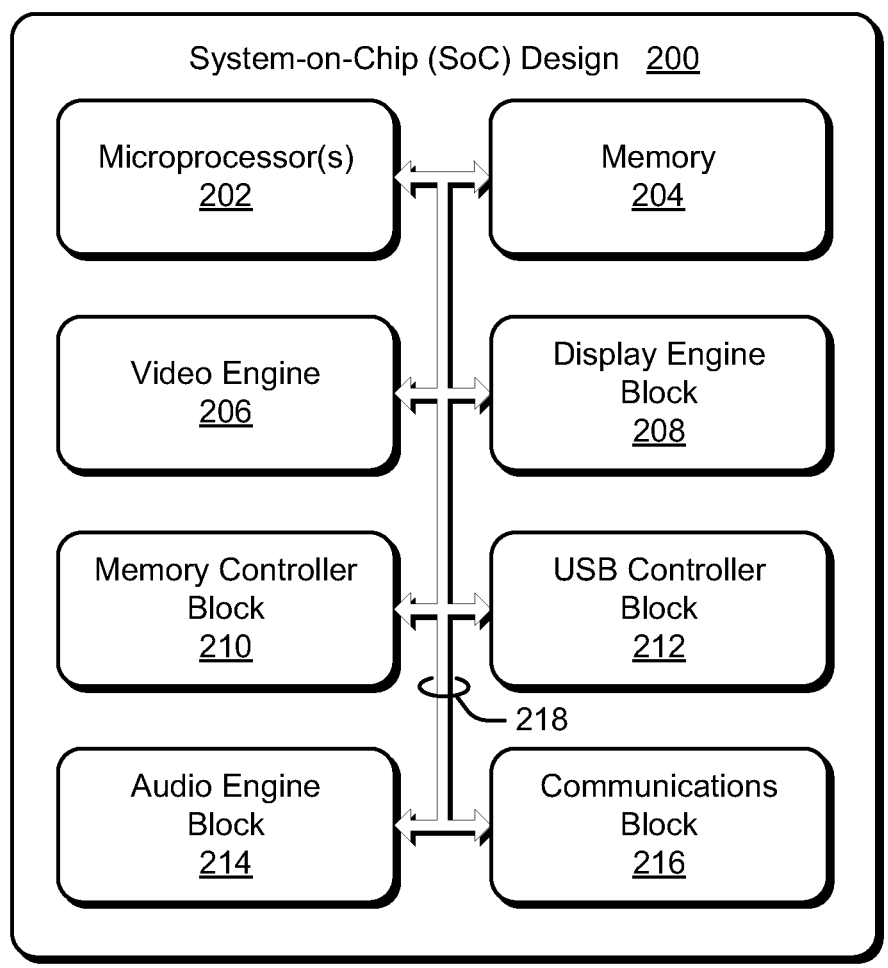
FIG. 2 illustrates a detailed aspect of an example System-on-Chip design.

FIG. 2 illustrates a detailed example of System-on-Chip (SoC) design 200, which is capable of being simulated by simulation platform 102. Generally, SoC design 200 is simulated during pre-silicon stages of SoC development to verify the design and diagnose potential design issues. Although illustrated an system level SoC that may be found in a smart phone, computing device, or media player, SoC design 200 may also be representative of other application specific SoCs, such as memory controllers, storage controllers, media controllers, communication controllers, transceivers, and the like.

In this example, SoC design 200 includes various components such as a microprocessor 202 (e.g., any of a microcontroller or digital signal processor) and a memory 204, which can be any type of RAM, low-latency nonvolatile memory (e.g., flash memory), ROM, and/or other suitable electronic data storage. SoC design 200 can also include various firmware and/or software (not shown), such as an operating system, which can be computer-executable instructions maintained by memory 204 and executed by microprocessor 202. SoC design 200 can also include other various IP blocks or functional blocks including input/output (I/O) blocks, video blocks, memory blocks, storage blocks, or communication blocks, to name a few. These IP blocks provide various functionalities of a SoC and may include hardware, firmware, and/or software for implementing the functionalities.

IP blocks of multimedia SoC design 200 include video engine block 206, display engine block 208, memory controller block 210, USB controller block 212 (e.g. a host controller, device controller, or On-The-Go controller), audio engine block 214, and communications block 216. Each of the IP blocks is capable of providing or enabling a specific functionality or feature when included in an SoC. For example, audio engine block 214 enables a SoC to decode, encode, and pre-process and post-process audio signals and data. Any number or combination of IP blocks of SoC design 200 may be third party IP blocks integrated with other IP blocks or components designed in-house. Integrating third party IP blocks into a SoC design can reduce development time and expense by leveraging a pre-designed IP block to provide a requisite feature or functionality. For example, display engine block 208, as a third party IP block, is integrated into SoC design 200 to provide display processing rather than designing a display IP block in-house.

SoC design 200 can also include an integrated data bus 218 that couples the various components and IP blocks of the SoC for data communication between the components. Integrated data bus 218 may be a custom data bus or an industry standard bus, such as a bus defined by the advanced micro-controller bus architecture (AMBA) specification that includes the advanced system bus (ASB), Advanced eXtensible Interface (AXI), advanced peripheral bus (APB), and advanced high-performance bus (AHB) standards. In addition to the AMBA specification, other industry standard bus standards and specifications include Atlantic, Avalon, Aurora, Open Core Protocol (OCP), and STBus.

Generally, components and IP blocks of SoC design 200 communicate via integrated data bus 218 when performing tasks or operations. Communication on integrated data bus 218 includes signal handshakes between IP blocks and components of SoC design. For example, when a data command is transferred between IP blocks and/or components, a series of requests and responses occur between the communicated entities as data is transferred. Parameters of these IP-to-IP transactions, such as values, data format, and/or timing may vary from one IP block to the next. For instance, a third party IP block may communicate differently than an IP block designed in-house, which may cause performance issues in a silicon SoC. Software 122 is capable of validating SoC design 200 at a pre-silicon design stage by simulating these data transactions with IP blocks and/or other components.

Figure 3:
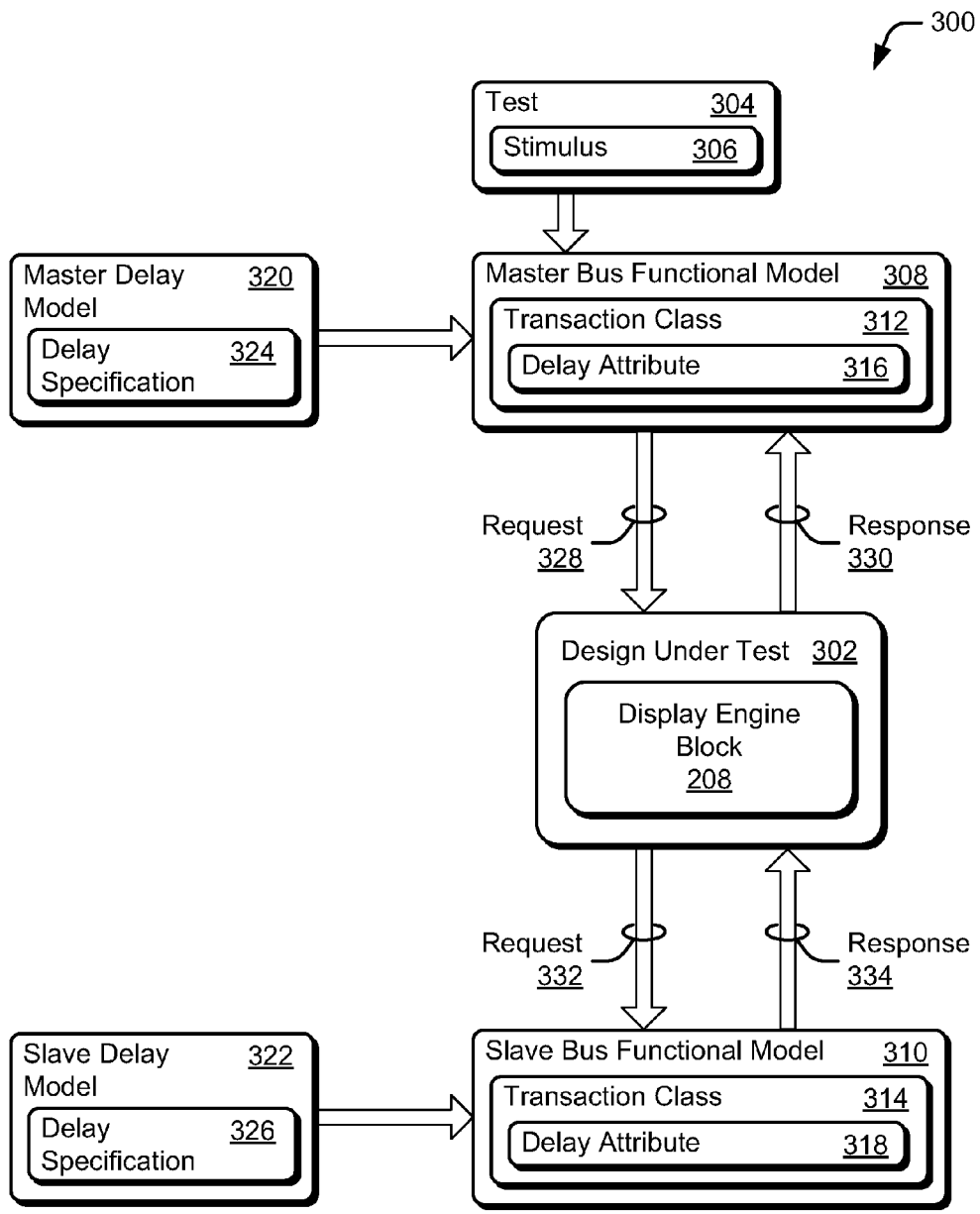
FIG. 3 illustrates an example simulation environment for performing pre-silicon validation.

FIG. 3 illustrates an example of a pre-silicon simulation environment (simulation environment) 300 of software 122 for validating various aspects of an integrated circuit or system design. Generally, a design of a SoC or IP block is modeled for pre-silicon simulation and validation. Validation includes subjecting the model of the design to various tests to exercise and verify functional space of the design. The model of the design-under-test (DUT) 302 interacts with various components of simulation environment 300 that are capable of replicating complex loading conditions.

In this example, DUT 302 is display engine block 208 of SoC design 200. Although illustrated as a single IP block under test, DUT 302 may contain any number and/or combination of IP blocks or components for validation. Simulation environment 300 includes test 304 that provides stimulus 306 for exercising functional space of DUT 302 through data transactions. Values of stimulus 306, such as length, address, offset, and/or transactions types, can be randomized to increase an area of functional space tested. Test 304 may include values or constraints for delaying the stimulus or data transactions. In other cases, values and constraints for timing and/or delays are separate from test 304, such as when included in delay models 126, which may contain a collection of timing and/or delay constraint information. Decoupling test 304 from delay models 126 allows parallel development of test 304 and delay models 126 reducing total development time. Multiple delay models may also be applied to test 304 expanding test coverage of functional space without modifying test 304.

Bus functional models (BFMs) 122 are implemented in simulation environment 300 as master bus functional model (master BFM) 308 and slave bus functional model (slave BFM) 310 that interact with DUT 302 based on stimulus response 306. In at least some instances, master BFM 308 and slave BFM 310 simulate DUT 302 from a perspective of a bus master or bus slave respectively. In this example, both BFMs are implemented, however, depending on the type of simulation or validation, master BFM 308 or slave BFM 310 may be implemented individually. Master BFM 308 and slave BFM 310 each include a respective transaction class 312, 314 defining various aspects of data transactions useful for testing DUT 302. Transaction classes 312, 314 each include a respective delay attribute 316, 318 to be applied to data transactions. Delay attributes 316, 318 can be randomized and/or constrained to simulate real-world loading conditions. Transaction classes 312, 314 also contain hooks (not shown) for delay information contained in delay models 126.

Delay models 126 are implemented in simulation environment 300 as master delay model 320 and slave delay model 322 that provide delay information to their respective BFMs. Although illustrated as separate entities in this example, in some instances BFMs and delay models may be combined. Master delay model 320 and slave delay model 322 each include a respective delay specification 324, 326 containing delay information for calculating and/or modifying delay attributes 316, 318. For instance, delay specifications 324, 326 can contain constraints and/or randomizations for delay attributes 316, 318. In some cases, the randomization is a distributed weighted randomization useful to replicate real-world loading conditions.

Master BFM 308 and slave BFM 310 are capable of performing data transactions with DUT 302. From the perspective of master BFM 308, a data transaction is an exchange of data including a request 328 and a response 330 exchanged with DUT 302. In some cases, multiple requests and responses are exchanged as part of a handshake or acknowledgment of the data transaction. Master BFM 308 generates request 328 using transaction class 312 and transmits request 328 based on delay attributes 316. Request 328 may be based on stimulus 306 and be value randomized to increase an area of tested functional space. In some cases, a delay attribute 316 associated with request 328 is randomized and constrained based on delay information of delay specification 324. Master BFM 308 can dynamically solve delay constraints and/or apply delay randomizations on a per-data-transaction basis to replicate real-world loading conditions.

From the perspective of slave BFM 310, a data transaction is an exchange of data including a request 332 and a response 334 exchanged with DUT 302. In some cases, multiple requests and responses are exchanged as part of a handshake or acknowledgment of the data transaction. Slave BFM 308 generates response 334 using transaction class 314 and transmits response 334 based on delay attributes 318. Response 334 may be based on request 332 and be value randomized to increase an area of tested functional space. In some cases, a delay attribute 318 associated with response 334 is randomized and constrained based on delay information of delay specification 326. Slave BFM 310 can dynamically solve delay constraints and/or apply delay randomizations on a per-data-transaction basis to replicate real-world loading conditions.

Techniques of Time Randomization for Complex IP Block Loading

The following discussion describes techniques for dynamic time domain randomization of responses (and stimuli) able to mimic real world loading conditions for an IP block. These techniques can be implemented using the previously described environment, such software 122 of FIG. 1 embodied on a simulation platform 102 and/or as simulation environment 300. These techniques include methods illustrated in FIGS. 4 and 5, each of which is shown as a set of operations performed by one or more entities. These methods are not necessarily limited to the orders shown for performing the operations. Further, these methods may be used in conjunction with one another, whether performed by the same entity, separate entities, or any combination thereof. In portions of the following discussion, reference will be made to operating environment 100 of FIG. 1 and entities of FIG. 2 and FIG. 3 by way of example. Such reference is not to be taken as limited to operating environment 100 or simulation environment 300 but rather as illustrative of a variety of examples.

Figure 4:
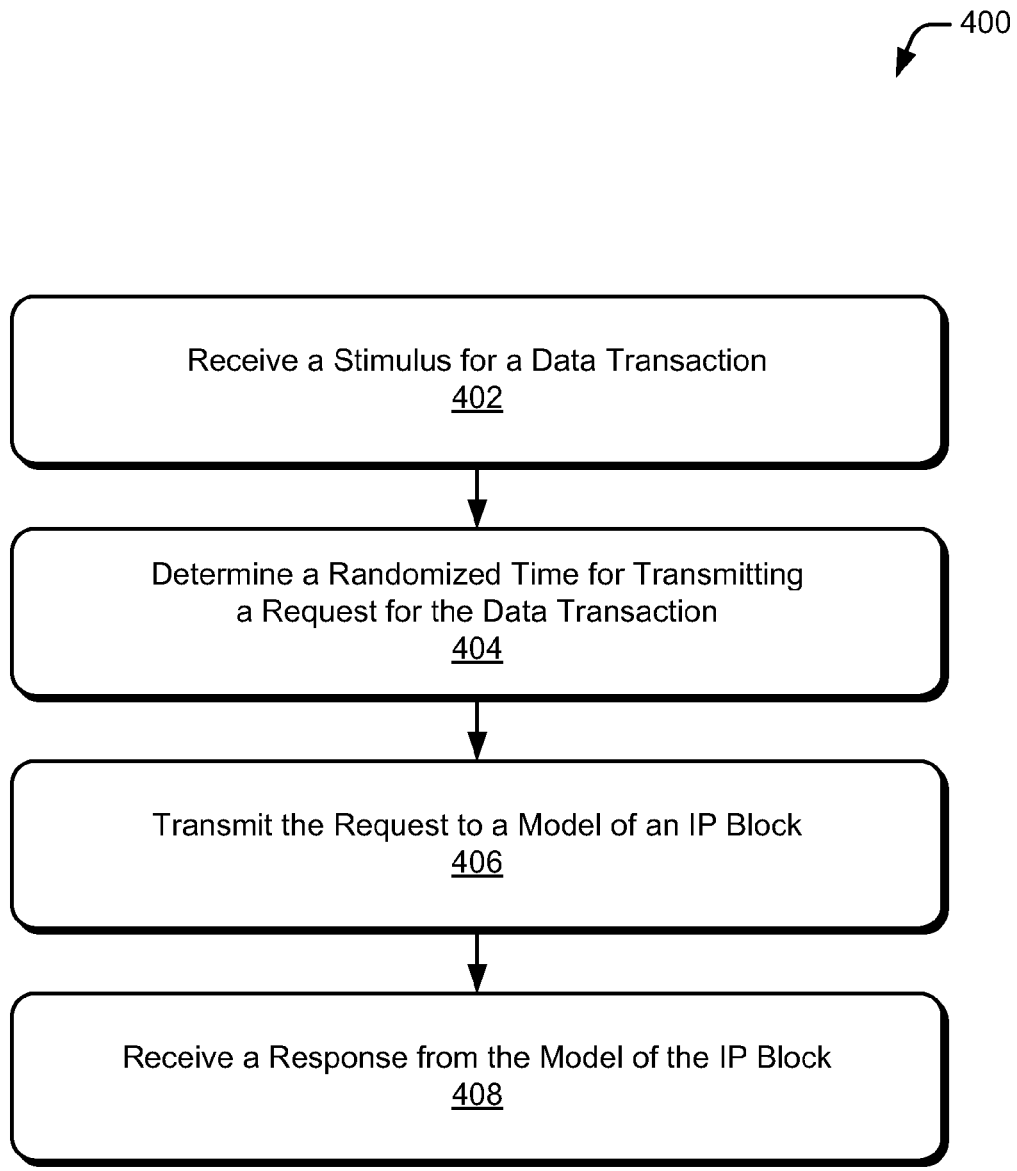
FIG. 4 illustrates a method of transmitting a request to a model of an IP block at a randomized time.

FIG. 4 depicts a method 400 for transmitting a request to a model of an IP block at a randomized time. Generally, method 400 allows a model of an IP block to be tested under complex loading conditions during pre-silicon validation.

At 402, a stimulus is received from a test. The test may be any suitable test for validating a design under test, such as an IP block or SoC design. The stimulus may contain information associated with a data transaction including a type, address, data, or length of the data transaction. In some cases, the stimulus interacts with a transaction class of a BFM to initiate a data transaction with a request. In the context of simulation environment 300, master BFM 308 receives stimulus 306 from test 304. Here assume that DUT 302 includes display engine block 208 and that stimulus 306 contains information for a video data transaction.

At 404, a randomized time is determined to define a time for transmitting a request based on the stimulus. The randomized time may be a delay useful for delaying transmission of the request. In some cases, the randomized time is calculated by a BFM using a timing attribute or delay attribute associated with the data transaction type. Alternately or additionally, a delay model may be queried by a hook in a transaction class for a delay specification, such as a randomizations or constraints useful for calculating the randomized time. The randomized time may be calculated on a per-transaction basis or real-time by a BFM replicating complex loading conditions.

Transmitting the request at a randomized time allows the design under test to be subjected to complex loading conditions during pre-silicon validation. For instance, with time randomization (e.g. delay randomization) a model of an IP block can be validated using tests that replicate real world conditions, such as backpressure stress, throughput stress, latency tolerance, and/or bandwidth requirements. These tests are able to detect IP block and interconnect issues that value randomized testing cannot. By so doing, IP block and interconnect issues typically discovered in post-silicon development stages can be found during pre-silicon development stages saving considerable time and costs.

In the context of the present example, master BFM 308 queries, via a hook in transaction class 312, master delay model 320 for delay information contained in delay specification 324. Here assume that delay specification 324 includes a distributed weighted randomization constraint for the video data transaction. To calculate the randomized time for transmitting the request, master BFM 308 applies the distributed weighted randomization to delay attribute 316.

At 406, a request is transmitted to a model of an IP block at the randomized time. The randomized time may be delay applied to a transmission time of the request. The request may be a request to initiate a data transaction with one or more IP blocks of a design under test. For example, the request may be a data read or data write command for initiating a read or write data transaction. In the context of the ongoing example, master BFM 308 transmits request 328 for the video data transaction to display engine block 208.

At 408, a response is received from the model of the IP block. The response is useful to characterize behavior of an IP block when fabricated (e.g. as silicon product) and subjected to complex loading conditions. Any suitable aspect of the response may be used to characterize behavior of the fabricated IP block. For example, a timing of the response may be indicative of the fabricated IP block's ability to perform a data transaction under complex loading conditions. Additionally or alternately, a response indicating failure or an inability to complete the data transaction may indicate an IP block or interconnect design issue.

Concluding the present example, master BFM 308 receives response 330 to the video data transaction request 328. Assume here that response 330 is indicates that the video data transaction completed successfully at display engine block 208, but was received later than expected, indicating a possible data bandwidth and/or latency issue. Based on response 330, data bandwidth and latency characteristics of display engine block 208 can be further validated pre-silicon to determine if an IP block or interconnect issue exists in the design.

Operations of blocks 404, 404, 406, and 408 may be repeated in order to subject a design under test to complex loading conditions during pre-simulation validation. Transmitting requests to a model of an IP block at randomized times replicates real-world loading conditions increasing an area of functional space tested during pre-silicon validation.

Figure 5:
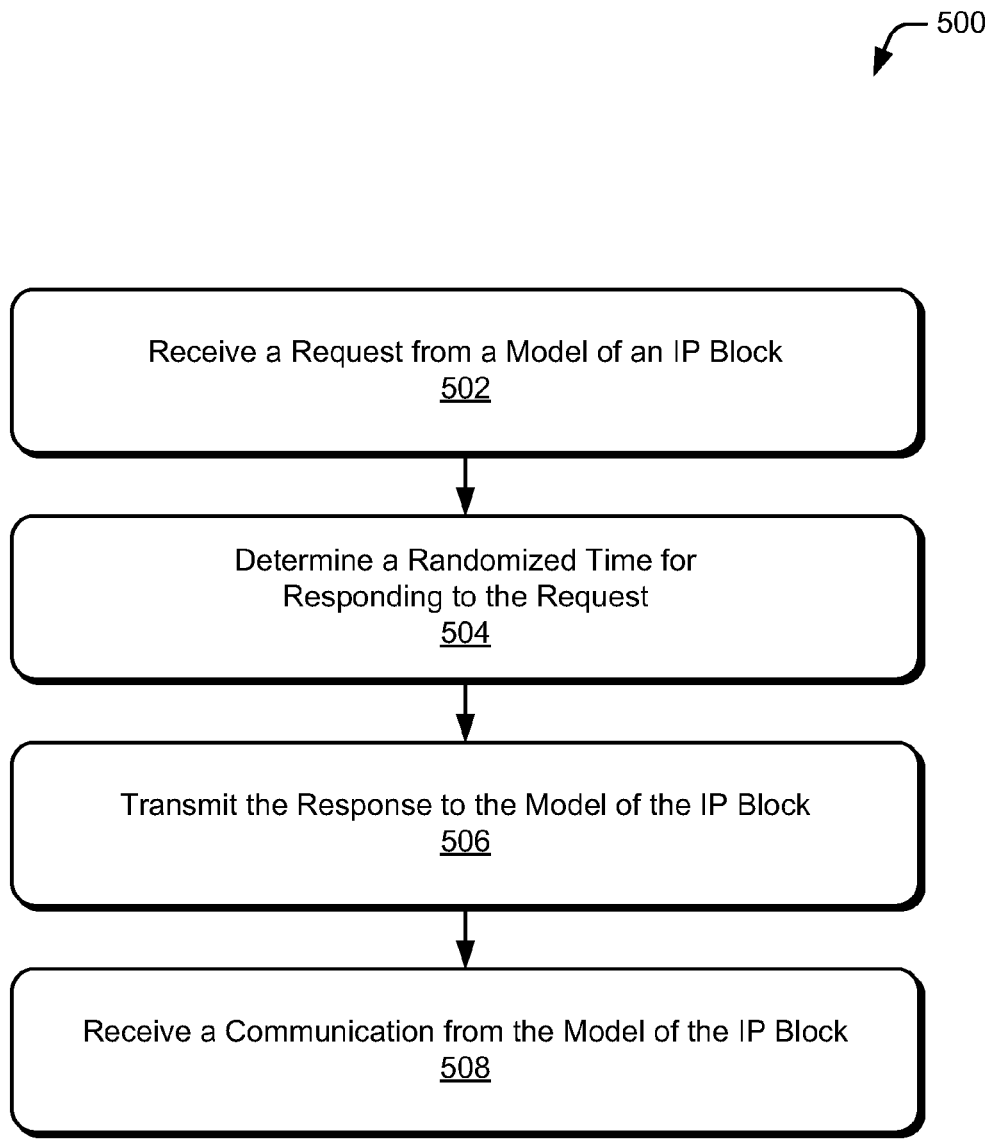
FIG. 5 illustrates a method of transmitting a response to a model of an IP block at a randomized time.

FIG. 5 depicts a method 500 for transmitting a response to a model of an IP block at a randomized time. Generally, method 500 allows a model of an IP block to be tested under complex loading conditions during pre-silicon validation.

At 502, a request is received from a model of an IP block. The model of the IP block may be part of a SoC design under test. The request may be for a data transaction including a data read or data write command for communicating data. For instance, a model of a USB host controller IP block may request a data read or a data write transaction. In the context of simulation environment 300, slave BFM 310 receives a request 332 from DUT 302, which includes display engine block 208. Here assume request 332 is a data read request for a data transaction to provide the read data to display engine block 208 for rendering.

At 504, a randomized time is determined by defining a time for responding to the request. The randomized time may be a delay useful for delaying transmission of a response. In some cases, the randomized time is calculated by a BFM using a timing or delay attribute. Alternately or additionally, a delay model may be queried by a hook in a transaction class for timing or delay specifications, such as randomizations or constraints useful for calculating the randomized time. The randomized time may be calculated on a per-transaction basis or real-time by a BFM replicating complex loading conditions.

Transmitting the response at a randomized time allows the design under test to be subjected to complex loading conditions during pre-silicon validation. For instance, with time randomization (e.g. delay randomization) a model of an IP block can be validated using tests that replicate real world conditions, such as backpressure stress, throughput stress, latency tolerance, and/or bandwidth requirements. By doing so, IP block and interconnect issues typically discovered in post-silicon development stages can be found during pre-silicon development stages saving considerable time and costs. In some instances, behavior of a system having multiple controllers capable of accessing data from a single source (e.g. a memory controller) can be characterized by transmitting data and/or responses at randomized times within a simulation environment.

In the context of the present example, slave BFM 310 queries, via a hook in transaction class 314, slave delay model 322 for delay information contained in delay specification 326. Here assume that delay specification 326 includes a distributed weighted randomization constraint for the data read transaction requested by display engine block 208. To calculate the randomized time for transmitting the response, slave BFM 310 applies the distributed weighted randomization to delay attribute 318.

At 506, a response is transmitted to the model of the IP block at the randomized time. The response may be value randomized wherein a length, address, data, and/or format is randomly selected. Alternately or additionally, the response may include data associated with a requested data read transaction. In such a case, the data may include randomized values, such as values randomized in real-time or on a per-transaction basis. For example, data included with a response to a model of an IP block can be randomized to replicate real-world application loading conditions.

In other cases, the response may include an acknowledgement or non-acknowledgement associated with a data write transaction. In the context of the present example, slave BFM 310 transmits response 334 to display engine block 208 including read data associated with the requested data read transaction. In this particular example, slave BFM 310 is emulating a memory controller capable of servicing requests from multiple other controllers.

At 508, a communication is received from the model of the IP block. The communication may be another request for a subsequent data transaction, an indication of a complete (or incomplete) data transaction, or a status update of a data transaction currently in process. In other cases, the communication may be a response including data associated with a previous request. The communication or indication is useful to characterize behavior of the IP block when fabricated and subjected to complex loading conditions.

Any suitable aspect of the communication may be used to characterize behavior or performance of the fabricated IP block. For example, a timing of the communication may be indicative of the fabricated IP block's ability to perform or respond to a data transaction under complex loading conditions. Additionally or alternately, a communication indicating failure or an inability to complete the data transaction may indicate an IP block or interconnect design issue.

Concluding the present example, slave BFM 310 receives an acknowledgement that the read data associated with the data read transaction has been received by display engine block 208. Assume here that the acknowledgement received at slave BFM 310 indicates a successful data transaction, but was received sooner than expected, which indicates possible excess bandwidth of display engine block 208 when receiving read data from a memory controller. Based on the acknowledgment received, display engine block 208 is determined to have sufficient bandwidth to receive read data when a response including the read data is transmitted at the randomized time.

Operations of blocks 504, 504, 506, and 508 may be repeated in order to subject a design under test to complex loading conditions during pre-simulation validation. Transmitting responses to a model of an IP block at randomized times replicates real-world loading conditions increasing an area of functional space tested during pre-silicon validation.

Figure 6:
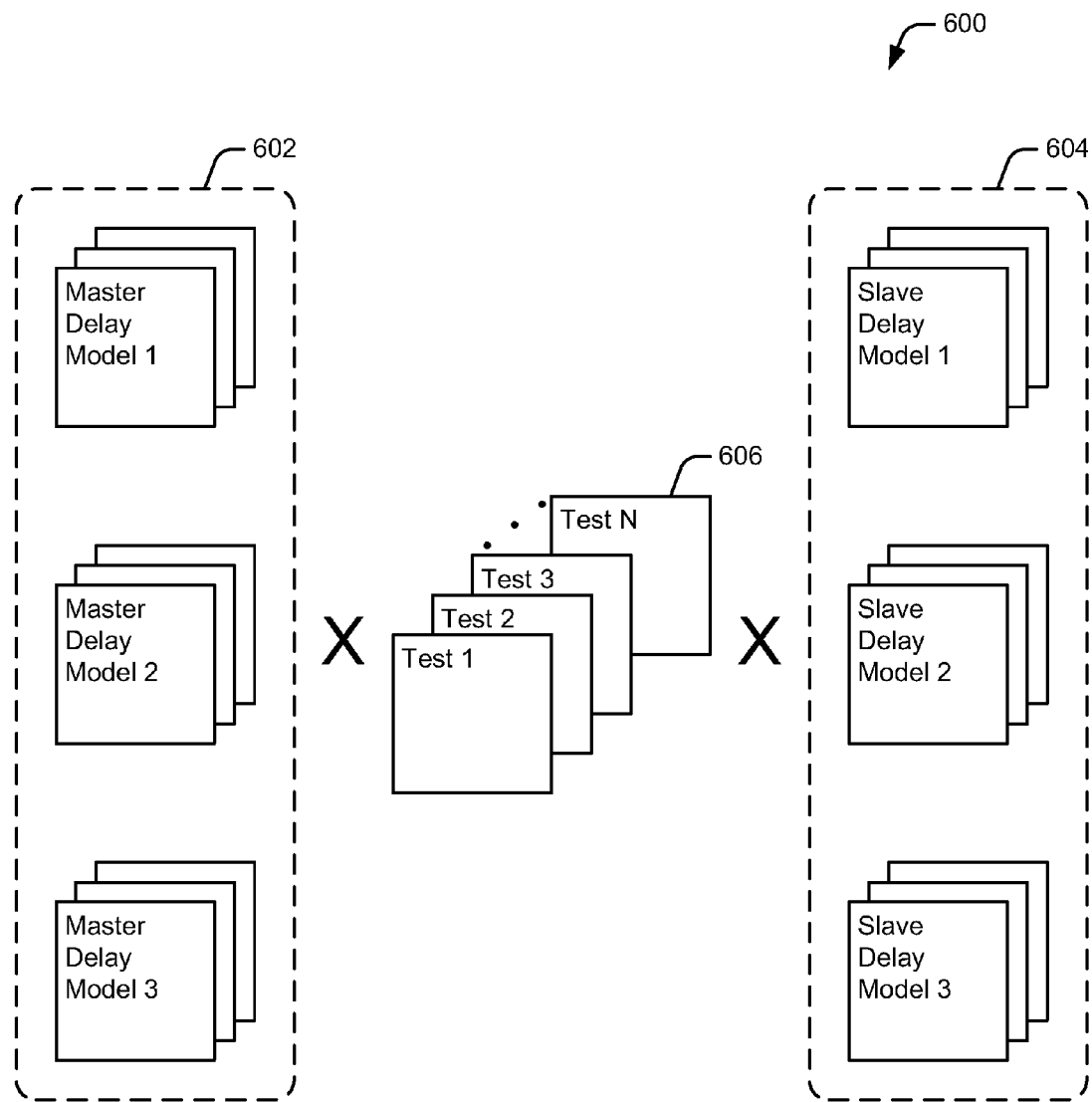
FIG. 6 illustrates an example of a test methodology for implementing time randomization for complex IP block loading.
Figure 7:
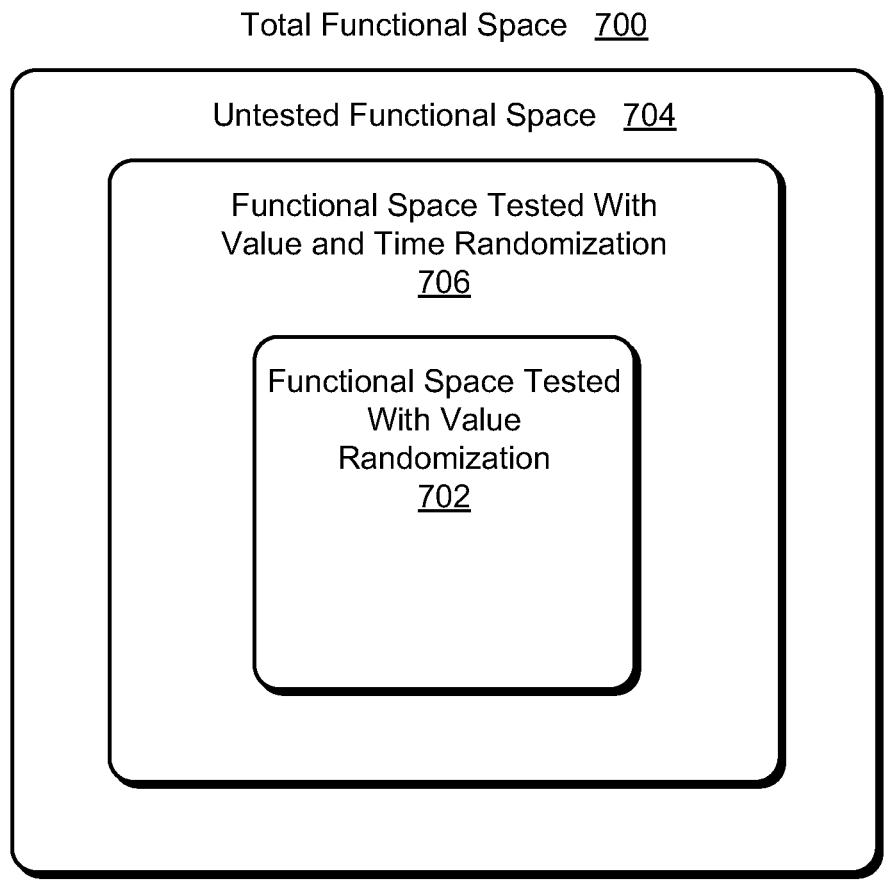
FIG. 7 illustrates an example of functional space tested with time randomization for complex IP block loading.

FIG. 6 illustrates an example of a test methodology for implementing dynamic time randomization for complex IP block loading. In this example, master delay models 602 and slave delay models 604 are applied to tests 606 to increase an area of tested functional space. Tests 606 may include value variability, such as values randomized on a per-transaction basis, in real-time, or based on a distributed weighted randomization. Instead of including value and time variability in tests 606, time variability is included in the delay models to decouple timing variability from tests 606. Because value and time variability are decoupled, tests 606 can be written and/or modified concurrently with master delay models 602 and slave delay models 604, thereby saving development time. As illustrated in FIG. 7, which illustrates an example of total functional space of a design generally at 700, a functional space tested with value randomization 702 of tests 606 leaves a substantial area of untested functional space 704.

By applying master delay models 602 and slave delay models 604, which contain time variability in the form of dynamic time randomization, to tests 606 the area of tested functional space is increased. By using time randomization, complex loading conditions, such as real-world application loading, which causes complex IP-to-IP transaction sequences, are replicated during pre-silicon simulation testing a larger area of functional space. As shown in FIG. 7, functional space tested with value and time randomization 706 reduces untested functional space 704 thereby increasing design confidence during pre-silicon development.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A method comprising:
    transmitting, via a bus functional model, multiple requests to a model of an IP block at respective randomized times, each of the respective randomized times dynamically calculated on a per-transaction basis using a distributed weighted randomization effective to subject the model of the IP block to a loading condition, the bus functional model implemented by executing instructions embodied on one or more computer-readable storage devices; and
    receiving, via the bus functional model, multiple respective responses from the model of the IP block that characterize behavior of the IP block when fabricated and subjected to the loading condition.

2. The method of claim 1, further comprising calculating the respective randomized time based on a time attribute or a time constraint.

3. The method of claim 2, wherein the respective randomized times are also dynamically calculated using a delay model including the timing randomization or the timing constraint.

4. The method of claim 2, wherein the model of the IP block is under test, and the time attribute or the time constraint are independent of the test.

5. The method of claim 4, wherein the test includes value variability for randomizing respective values of the multiple requests on a per-transaction-basis.

6. The method of claim 1, wherein the loading condition replicates real-world application loading or sequence of IP-to-IP transactions.

7. The method of claim 1, wherein the model of the IP block is configured for bus-level communicative interaction and configured to respond as the IP block when fabricated.

8. A method comprising:
    transmitting, via a bus functional model, multiple responses to a model of an IP block at respective randomized times, each of the multiple responses responding to a request from the model of the IP block, each of the respective randomized times dynamically calculated on a per-transaction basis using a distributed weighted randomization effective to subject the model to a loading condition, the bus functional model implemented by executing instructions embodied on one or more computer-readable storage devices; and
    receiving, via the bus functional model, communication from the model of the IP block useful to characterize behavior of the IP block when fabricated and subjected to the complex loading condition.

9. The method of claim 8, wherein the model is configured for bus-level communicative interaction and configured to communicate as the IP block when fabricated.

10. The method of claim 8, further comprising calculating the respective randomized time based on a time attribute or a time constraint.

11. The method of claim 10, wherein the time attribute or the time constraint are included in a delay model that is separate from the bus functional model.

12. The method of claim 8, wherein the response includes data associated with the request from the model.

13. The method of claim 8, wherein each of the multiple responses include a randomized value and each of the randomized values is based on distributed weighted randomization.

14. The method of claim 13, wherein the distributed weighted randomization used to calculate the randomized values is included in a test that is separate from the bus functional model.

15. One or more computer-readable storage devices embodying computer-executable instructions that, when executed, implement a bus functional model to:
    query a delay model for a delay specification, the delay specification having a distributed weighted randomization constraint, the delay model separate from the bus functional model;

transmit, to a model of an IP block, multiple requests at respective randomized times effective to subject the model of the IP block to a loading condition, each of the respective randomized times dynamically calculated on a per-transaction basis using the delay specification; and receive, from the model of the IP block, multiple respective responses useful to characterize behavior of the IP block when fabricated and subjected to the loading condition.

16. The one or more computer-readable storage devices of claim 15 embodying additional computer-executable instructions that, when executed, further implement the bus functional model to calculate each of the respective randomized time based on a time attribute or time constraint of the delay specification.

17. The one or more computer-readable storage devices of claim 15, wherein each transaction of the per-transaction basis corresponds to one of the multiple requests.

18. The one or more computer-readable storage devices of claim 15, wherein the delay model is queried via hooks of a transaction class associated with the bus functional model.

19. The one or more computer-readable storage devices of claim 15, wherein the computer-executable instructions are based on or compiled from a hardware description language (HDL) or a hardware description and verification language (HDVL).

20. The one or more computer-readable storage devices of claim 15, wherein the model of the IP block is a model of a component of a System-on-Chip (SoC), an application-specific integrated circuit (ASIC), or a very-large-scale-integration (VLSI) circuit.

* * * * *